Nov. 12, 1968   M. S. JOHNSTON   3,410,458
BEER TAPPING DEVICE
Filed Jan. 25, 1967   2 Sheets-Sheet 1
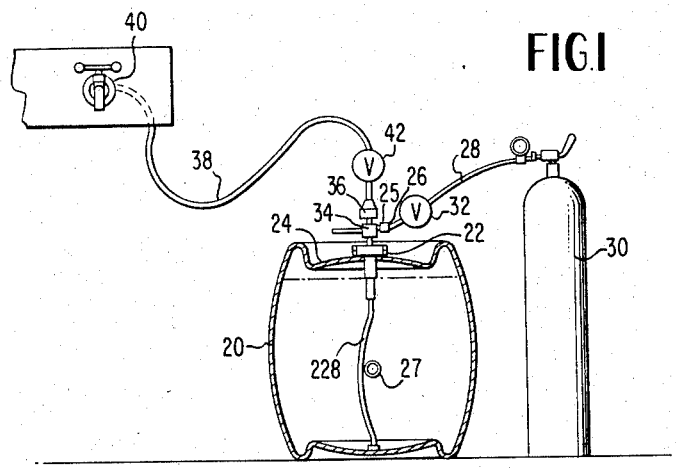
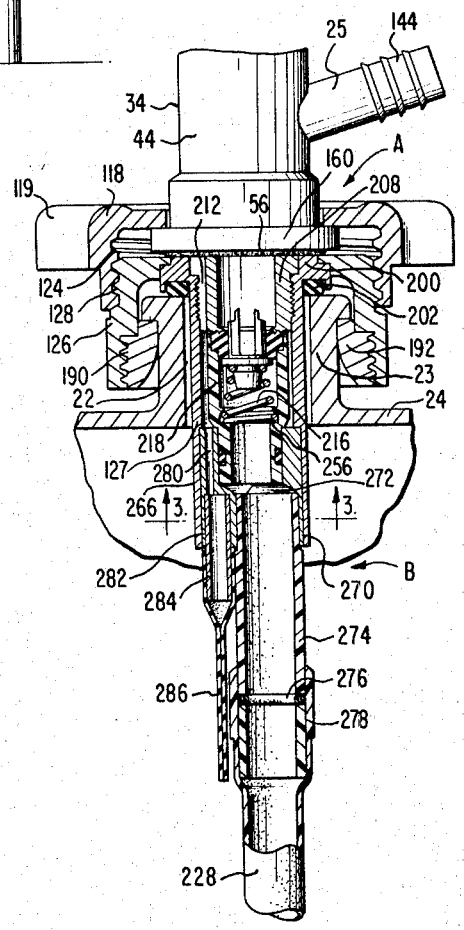
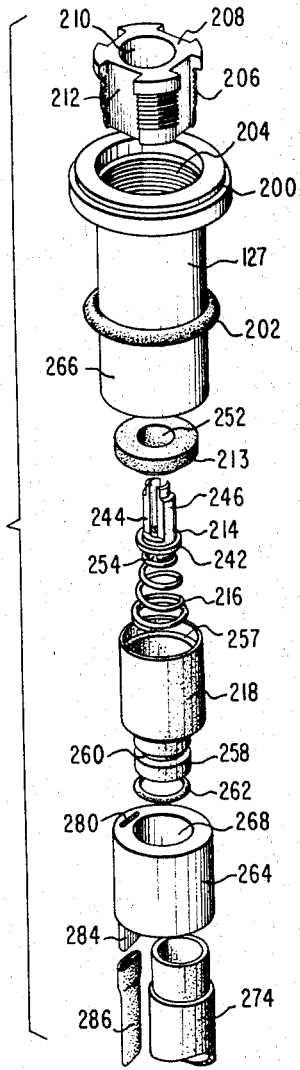
INVENTOR
MACK S. JOHNSTON
BY *Le Blanc & Shur*
ATTORNEYS Nov. 12, 1968    M. S. JOHNSTON    3,410,458
BEER TAPPING DEVICE Filed Jan. 25, 1967    2 Sheets-Sheet 2

INVENTOR
MACK S. JOHNSTON

BY *LeBlanc & Shur*

ATTORNEYS

United States Patent Office 3,410,458
Patented Nov. 12, 1968

3,410,458
BEER TAPPING DEVICE
Mack S. Johnston, Rolling Hills, Calif., assignor to Johnston Enterprises, Inc., East Kalispell, Mont., a corporation of Montana
Continuation-in-part of application Ser. No. 587,627, Oct. 18, 1966. This application Jan. 25, 1967, Ser. No. 611,610
17 Claims. (Cl. 222—400.7)

ABSTRACT OF THE DISCLOSURE

This invention relates to a beer tapping device and especially to an improved adapter for attachment in the beer outlet of a standard keg. It comprises a unit insertable from outside the keg and having a transition element forming a part of separate liquid and gas passageways. At least the liquid passage through the transition element has its lower end offset to take optimum advantage of the limited space available, while at the same time rendering the unit compatible with existing systems.

---

This application is a continuation-in-part of copending application Ser. No. 587,627, filed Oct. 18, 1966, which is in turn a continuation of application Ser. No. 406,682, filed Oct. 27, 1964, now abandoned.

This invention relates to a new and improved tapping device for drawing liquids such as beer from containers such as beer kegs or barrels, using a gas to drive the fluid from the container. In particular, the invention relates to a new improved tapping device completely enclosed in metal and usable with conventional beer kegs such as the so-called "Peerless" systems and particularly to a subunit called a "keg adapter" which constantly seals the keg and cooperates with another subunit called a "coupler" which is attached to the beer dispensing apparatus in a restaurant or tavern and is readily connected to the keg adapter so that the tapping device is automatically in operating condition.

Today, as is the past, the most widely prevailing practice in the beer industry is for a brewery to provide draft beer to retail outlets in "conventional" kegs which, for the most commonly used "Peerless" system, have a ¾ inch opening in the top closed with a bung in the form of a cork or plug. To dispense the beer from the keg, the bartender "taps" the keg by knocking in or pushing in the bung and inserting an elongated tap rod with an associated "siphon" device for drawing the beer from the keg, these being fastened to the keg by means of a "bayonet" or like connection. This siphon device includes means for injecting compressed air or $CO_2$ through the tap rod into the keg to drive the beer through the siphon and also external valve means for respectively controlling the flow of gas into the keg and beer from the keg. A gas supply hose connects the siphon to a source of gas, and another hose connects it to the beer dispensing apparatus mounted on the counter or bar in the resturant or tavern whereby beer may be dispensed from the keg. When the beer has been withdrawn from the keg to the extent feasible, the bartender then removes the tap and siphon device from the keg, removes the keg from the dispenser cabinet, and installs a new keg and repeats the process of knocking in or pushing in the bung and installing the tap rod and related siphon equipment, etc. The same tap rod and siphon is used for every keg and must be washed and cleaned periodically to prevent fouling and contamination.

The term "siphon" is used herein to describe the tapping devices, such as the tapping device of this invention, for kegs and like containers in accordance with conventional practice, although the term is technically a misnomer in that such tapping devices do not utilize a siphon or the siphon principle in any way. When the term "siphon" is used herein, it is to be understood that it is used in accordance with accepted practice and refers to a tapping device for beer kegs and the like of the type disclosed and claimed.

The prevailing practice in tapping a beer keg which has been used for 50 years has a number of disadvantages for the brewery, the dispensing establishment, and the public. These are set forth in more detail in my copending application Ser. No. 587,627, filed Oct. 18, 1966, which application is incorporated herein by reference. Briefly, they include the fact that the keys often become filled with insects, small animals and debris of every sort, yeast and other solids from the beer inevitably accumulate with the resultant accumulation of the destructive bacteria and further a substantial quantity of beer is often lost during the tapping process. Other disadvantages include the fact that conventional tapping systems require a certain amount of strength and may be dangerous to the bartender so that it is more difficult to tend bar, especially for a female.

In my aforementioned copending application Ser. No. 587,627, filed Oct. 18, 1966, I have disclosed a new improved beer tapping device for dispensing beer or like liquids in kegs or barrels which overcomes the above-discussed and other problems and shortcomings of beer dispensing systems heretofore available and also provides a number of impotrant advantages and improved results as hereinafter set forth. Particularly, the invention of that application provides a new, improved means for packaging and dispensing beer and like liquids in kegs utilizing an adapter assembly installed in and sealing the keg at the brewery with an also improved coupler subassembly which is fastened to the keg adapter by the tavern keeper or bartender, thus, automatically breaking the seal and readying the keg for dispensing of beer. Simple removal of the aforementioned coupler subassembly by the bartender causes the keg to automatically reseal, thereby positively preventing the entry of trash or other foreign objects. In addition, the beer is positively prevented from entering the gas passageway portion of the tapping device, thus preventing contamination or fouling of this portion of the device by dried beer residue normally accumulating due to the surging of the beer.

It is an object of the present invention to provide a further novel and improved beer tapping device and novel improved keg adapter subassembly and components for the same of the general type disclosed and claimed in my aforesaid application Ser. No. 587,627, so as to provide additional improvements in construction, mode of operation and result as below set forth.

It is another object of the present invention to provide a keg adapter having a compact and efficient gas check valve positioned within the beer keg and surrounding a lower tap rod extending from the keg adapter unit, with the upper end of the gas check valve communicating with improved enlarged gas passageways uniquely formed in a keg adapter unit to provide an enlarged beer passage and an especially enlarged gas passage adequate for flow of beer therethrough, particularly when used in a "series" beer keg installation, without structurally weakening the keg adapter unit or enlarging the unit beyond the commercial size limitation imposed by the ¾ inch standard keg opening of a "Peerless" system for both low and high pressure draft beer systems.

It is still another object of the present invention to provide an improved tapping assembly and particularly an improved keg adapter subassembly or unit in which the parts are all surrounded by metal, such as stainless steel or the like. Subassemblies so constructed have increased strength and greater resistance to corrosion while, at the same time, present a neater and more attractive unit highly acceptable to the beer tapping industry. These results are achieved while maintaining enlarged beer and gas passageways without narrow tortuous paths or undue obstructions which might otherwise tend to render the beer wild, flat, or otherwise less satisfactory and which are most important for series type connections wherein several kegs of beer are connected in series, necessitating the passage of beer through both passageways of the adapter unit.

Another object of the present invention is to provide an improved beer tapping device and adapter subassembly which can be used with any standard type of beer keg in common usage of the so-called "Peerless" type, even though the kegs typically vary considerably in configuration and size according to source and time produced. The enclosed metallic unit of the present invention has the important advantage that it can be inserted from the top of the keg and avoids the difficulties of prior units, many of which had to be inserted and assembled from the keg interior, access being had to the interior of the keg through a separate outlet or cleaning aperture provided for that purpose. The keg adapter unit of this invention is semi-permanently fastened in the beer keg, does not protrude from the end of the keg, and thus avoids damage by rough handling during transit to and from the breweries.

A further object of the present invention is to provide a new and improved arrangement for packaging and dispensing beer or the like from a keg or like container which achieves the above-discussed objects and advantages. Important features of the present invention are the provision of enlarged beer and gas passageways in units which may be cheaply manufactured and assembled and which avoid abrupt variations and narrow restrictions in the flow passageways which might otherwise tend to render the beer excessively flat or wild. In one embodiment of the present invention, the flow passageways are provided in a plastic material which may be readily molded from inexpensive dies so as to avoid extensive machining required for metal units. At the same time, the unit is completely enclosed or surrounded by an outer metallic sleeve for protection and to provide a clean, modern and attractive appearance to the adapter unit. The unit is readily insertable from the top of the keg and is adapted for all types of the so-called "Peerless" kegs having a nominal keg aperture in the top of approximately ¾ inch in diameter.

These and further objects and advantages of the invention will be more apparent from reference to the following specification, claims and appended drawings, wherein:

FIGURE 1 is a schematic view showing the novel packaging and dispensing tapping device of the present invention as installed in a beer keg associated with a beer dispenser in a so-called "Peerless" type system, in conjunction with a source of gas under pressure, the beer keg being broken away and shown in section for clarity;

FIGURE 2 is a vertical cross section through a portion of the tapping device of FIGURE 1, particularly showing the details of the novel adapter unit of the present invention, further illustrating the manner in which it is mounted to a beer keg and how it cooperates with the coupler subassembly of the tapping device of FIGURE 1;

FIGURE 4 is an exploded view showing various elements of the novel adapter unit illustrated in FIGURES 1-3;

Figure 3:
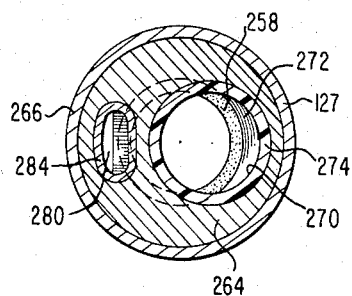
FIGURE 3 is a cross section through the lower end of the adapter unit of FIGURE 2 taken along the line 3—3 of FIGURE 2.

The beer or similar tapping device of the present invention is, in many respects, similar to that disclosed and claimed in my copending United States application Ser. No. 587,627, filed Oct. 18, 1966. Like parts bear like reference numerals. All the drawings and the entire specification of that application are incorporated herein by reference as though here fully set forth.

Referring to the instant drawings and especially to FIGURE 1, there is schematically shown a conventional beer keg 20 of the so-called "Peerless" type having an opening 22 in its top wall 24 in which opening there is received the adapter unit B of the present invention, this unit being semi-permanently installed in the keg 20. A normally closed cleaning opening 27 is formed in the sidewall of the keg. The coupler unit A of the present invention can be readily connected with the adapter unit B to form a tapping assembly as hereinafter amplified. The dispenser coupler unit A has a gas inlet port and fitting 25 adapted to receive a coupler 26 at the end of a gas supply tube 28 which communicates with a gas supply tank 30. If desired, a valve 32 of suitable conventional type may be controlled at the location of the keg 20. The dispenser coupler unit also has a beer exit fitting 34 which is adapted to receive a conventional coupler 36 at the end of a flexible tube 38 through which the beer is conducted to a conventional dispenser 40. If desired, a suitable valve 42 may also be associated with the coupler 36 in a conventional manner for control of the beer flow at the keg 20. The arrangement of FIGURE 1 is shown merely for the purpose of illustrating usage of the present invention. Since the components thereof, other than the units A and B and particularly adapter B, are conventional and do not comprise a part of the present invention, further description thereof is believed unnecessary as dispensing arrangements for use with the new improved tapping device of this invention will be apparent to those skilled in the art in light of the disclosure herein.

Referring particularly to FIGURES 2-4, the new improved tapping device of this invention comprises two main units A and B, herein generally called the "dispenser coupler" and "keg adapter," respectively. Dispenser coupler unit A is similar to that shown in my above mentioned copending application Ser. No. 587,627 and in particular is like the unit illustrated in FIGURES 1, 3 and 3a of that application. It comprises a main cylindrical head portion 44 which is provided with an internal bore and carries a threaded collar 119 for fastening to the keg adapter unit B as explained below.

A tubular arm 144 having a central bore is preferably formed integral with the head 44 and is adapted to receive the end of a piece of tubing that connects the coupler unit A to the tank of pressurized gas or air, such as the tank 30 shown in FIGURE 1. The coupler unit A also includes a generally hollow probe (not shown) which is positioned within the bore provided in head 44. The central bore of the probe forms the sole liquid passageway through the coupler unit A and incoming gas passes through the coupler around the probe. The interior of the probe is provided with grooves for sealing rings and these sealing rings preclude the escape of gas in a manner more fully set forth in said copending application. Reference may be had to that application for a more detailed description and explanation of the coupler unit A of the present invention.

An annular member 160 is secured above the slightly enlarged lower end of the coupler head 44 by a snap ring and retains collar 118 rotatably mounted on the coupler head 44. The collar 118 has a plurality of handle portions 119 formed integrally therewith, is internally threaded as at 124 for cooperation with the threaded portion 128 of an annular ring 126, and fits loosely on the head, thereby permitting relative rotation between the collar and head. Upward movement of the collar along the head may be limited if so desired by projections (not shown) formed integral with the head 44. The bottom af the head carries an annular seal 56 which may be an "O-ring" of neoprene rubber for providing an annular seal between the coupler unit A and the upper surface of a metallic sleeve 127 (FIGURES 2 and 4) of adapter unit B, surrounding the beer and gas passages. The coupler unit A is substantially identical to the coupler unit illustrated in FIGURE 1 of application Ser. No. 587,627 (original FIGURE 9 of that application).

An important feature of the present invention is the provision of an improved adapter unit B and particularly one provided with a surrounding metal sleeve such as sleeve 127 enclosing the elements forming the gas and liquid passages through the adapter unit. This metallic encased unit is provided with enlarged liquid and gas passageways, while, at the same time, is adapted for insertion from the top of the keg into a standard "Peerless" type opening having a nominal diameter of ¾ inch. The adapter of the present invention is particularly suited for series connections wherein both the liquid and gas passageways must be relatively large and unobstructed to avoid excessive foaming and wildness in the beer and at the same time is manufactured from inexpensive elements which may be economically machined or, in some cases, molded and which may be readily disassembled for cleaning, particularly cleaning of the elements forming the liquid valve in the adapter.

The keg adapter unit B is held in the standard opening 22 in a conventional beer keg 20 by means adapted to cooperate with the standard so-called "Peerless" beer keg flange or collar 23 in a manner more clearly shown in FIGURES 6a–6e of application Ser. No. 587,627. This securing means includes the previously described ring 126 which has its lower end spaced slightly above the top of the keg 20 in FIGURE 2 and which is internally threaded at 190 to receive an externally threaded ring 192. As more fully described in the aforementioned copending application, ring 192 includes a thin wall section and upwardly projecting diametrically opposite tabs formed on its inner periphery. This ring 192 is snapped over the flange 23 so that it rests on the top 24 of keg 20 with the tabs extending upwardly and the ring 192 is aligned so that the projections of the flange 23 fit between adjacent tabs and abutments on the ring. The keg adapter unit is checked to be sure that the adapter is properly positioned within the keg opening 22. The ring 126 is then placed over the upper end of the adapter and aligned with the flange 23. Thereafter, the ring 126 is threaded on ring 192 so that the ring 192 is drawn up within the lower inside portion of ring 126 until the upper ends of the tabs on ring 192 contact the underside of keg flange 23. Thus, when the rings 126 and 192 are assembled, they cooperate with the flange 23 to securely lock the keg adapter unit within the opening 22 to prevent any longitudinal or rotational movement of the adapter unit relative to the opening. Ring 192 may be inexpensively molded of plastic without sacrificing strength or ruggedness of the keg adapter B since the metal ring 126 completely protects plastic securing ring 192 as well as the adapter unit. By removing one of the lugs and abutments, ring 192 may be made of metal and still slipped over the "Peerless" collar 23 to act in a similar manner.

Referring particularly to FIGURES 2–4, the keg adapter unit B is provided with the metal sleeve 127 to surround and protect the components forming the liquid valve, liquid passageway, and gas passageways through the adapter. For this purpose, it is provided with an upper stepped flange 200 which engages with the securing ring 126 and when this ring is clamped to the beer keg flange, presses down on an annular sealing or "O-ring" 202 to seal the sleeve 127 against the upper surface of the beer keg flange 23. The upper interior portion of metal sleeve 127 is internally threaded as at 204 to mate with the spaced or segmented threads 206 on a preferably metal insert 208. Metal insert 208 is provided with a central tubular passageway 210 forming a portion of the liquid or beer passageway through the adapter unit B while the threaded segments 206 provide four spaced channels 212 between segments which permit the passage of gas through the adapter B. When assembled, the lower end of insert 208 bears against a stepped chucking washer 213 forming a valve seat for a bifurcated stainless steel valve 214 acting against a valve spring 216.

Valve retainer insert 208 is preferably formed of metal such as stainless steel, but, if desired, may be made of a suitable plastic such as a polycarbonate sold under the trade name "Lexan." It is formed with four rows of cooperating threads at 206 equidistantly spaced about its periphery by the four slots 212. These threads are received in threaded engagement with the internal threads 204 of the outer sleeve 127. The upper ends of the slots 212 may be engaged by a suitable spanner wrench so that the insert may be threaded into the sleeve. Chucking washer 213 abuts against the underside of insert 208 and has a reduced diameter lower annular portion which abuts a flange 242 on the valve 214. Valve 214 has a bifurcated construction including a pair of upwardly extending arms 244 and 246 which are notched at their upper ends to receive the lower end or nose of the hollow probe (not shown) of the coupler unit A. Legs 244 and 246 of the valve pass through a central aperture 252 formed in the chucking washer 212 and constituting a portion of the liquid or beer passageway through the adapter.

Valve spring 216 is a helical compression spring and has its upper end wrapped around and secured to reduced end 254 of valve 214. A central plastic insert 218 is formed with an internal shoulder 256 (FIGURE 2) upon which rests the lower end of spring 216. The upper end of the chucking washer 213 rests on a second shoulder 257 formed on the inner surface of center section 218. The reduced lower end 258 of center section 218 is formed with an annular groove 260 receiving an "O-ring" seal 262. Center section 218 is preferably formed of plastic such as the polycarbonate sold under the trade name "Lexan."

An additional important feature of the present invention is the provision of a transition element in the form of a hollow tube 264 which is adapted to be received by a press fit or otherwise suitably secured within the lower end 266 of outer metal sleeve 127. While the transition element or tube 264 may be made of plastic such as "Lexan," in the embodiment illustrated it is made of metal so as to provide a substantially complete metallic enclosure for the interior valve and plastic elements of the adapter B. The liquid passageway through transition element or metal tube 264 is in three parts which are formed respectively by central tubular passage 268 concentric with the longitudinal centerline or axis of the sleeve and extending approximately from the upper surface halfway through tube 264, by a lower tubular passage 270 extending approximately halfway through the tubular element from its lower end, which lower circular cross section passageway is offset from the central axis of the transition element 264 (and sleeve), and finally by a third angled or slanted passageway 272 adjoining upper circular passageway 268 with the lower offset circular passageway 270. These passageways may be readily machined in the metallic element 264 by means of a tapered drill or boring tool such that the angular or slanting passage 272 is formed by the tapered leading edge of the tool in boring out the two circular passageways 268 and 270. This provides a large and relatively unobstructed liquid flow path through the unit with a relatively smooth transition affording flow of a liquid such as beer through tube 264.

Upper central circular passageway 268 is adapted to receive the lower reduced end 258 of plastic center section 218 by means of a press fit and is sealed thereto by annular gasket 262. Similarly, the lower and offset circular passage 270 receives the upper end of a short plastic tube 274 which similarly may be formed of a polycarbonate such as "Lexan." Plastic tube 274 is adapted to be secured to siphon tube 228 by a sealing gasket 276 and ferrule 278. Siphon tube 228 is similarly preferably formed of rigid plastic such as the polycarbonate "Lexan" and is preferably curved or bowed as in FIGURE 1 to provide clearance for the insertion of a cleaning tool through cleaning aperture 27 of the keg. The lower end of the siphon tube 228 may be notched so that beer may gain access to the interior of the tube or, alternatively, a suitable strainer may be attached to the lower end of the siphon tube. If desired, the siphon tube may be formed of a flexible plastic so that it is simply brushed aside when a cleaning tool is inserted through the aperture 27 of the keg.

Formed in transition element or tube 264, is a straight, elongated and relatively narrow slot 280 which extends from the upper surface of the transition element approximately halfway through it. This slot communicates for the passage of air or other gas with a similar but enlarged ellipically shaped slot 282 extending from the lower surface of the transition element up to a junction with the smaller slot 280. Press fit within the lower enlarged elliptically cross sectioned aperture or slot 282, is a short elliptically shaped section of metal pipe 284. Adhesively secured or otherwise suitably attached over the lower end of metal pipe 284, is a Thomas type rubber gas check valve 286 of conventional construction formed of suitable surgical gum rubber or, if desired, of a suitable silicon rubber. This rubber valve acts in a well known manner to permit the flow of gas therethrough into the interior of keg but at the same time, prevents the flow of gas or liquid from the keg outwardly through valve 286.

As can be seen, the keg adapter B of FIGURES 2–4 provides enlarged liquid and gas passageways through the unit to prevent foaming or wildness in the beer while, at the same time, taking optimum advantage of the space available in a conventional "Peerless" type beer keg opening having a nominal diameter of ¾ inch. An important feature of the present invention is that the interior elements of the adapter are protected and substantially surrounded by metal and the unit is insertable from the top of the keg through the conventional keg aperture 22, thus eliminating the necessity for manipulating the adapter into position from the interior of the keg such as by reaching through a cleaning opening as that illustrated at 27 in FIGURE 1. This is made possible by the provision of angular or offset flow passages through a transition element such as the tube 264 of the present invention whereby the lower ends of both the liquid and gas passageway through the transition element are offset to provide an increased flow area therethrough. The device may be readily and inexpensively machined and provide relatively large passageways without undue restrictions so as to prevent wildness and foaming of the beer. At the same time, the adapter unit may be cleaned with conventional equipment since the valve assembly is located along the axial centerline of the keg opening with the eccentric or offset portions of the liquid flow occurring only at the lower end of the adapter unit.

Figure 5:
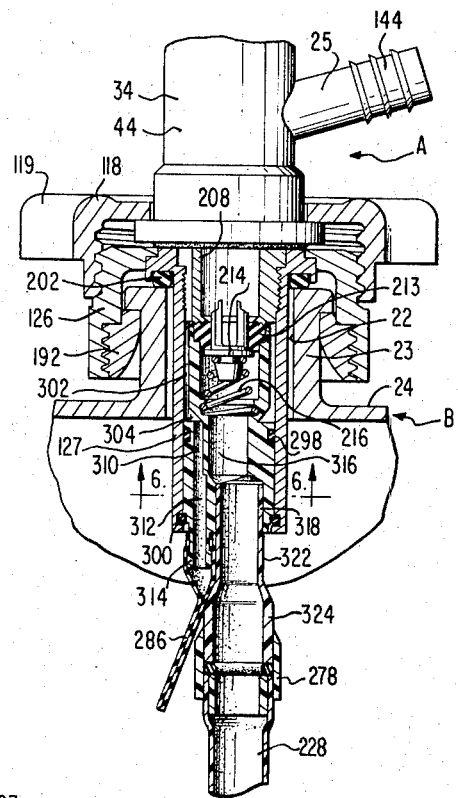
FIGURE 5 is a cross section through a modified keg adapter unit constructed in accordance with the present invention wherein the enlarged liquid and gas passageways are formed in a moldable plastic unit again enclosed in a metallic sheath or sleeve and insertable from the top of a standard "Peerless" type beer keg.
Figure 7:
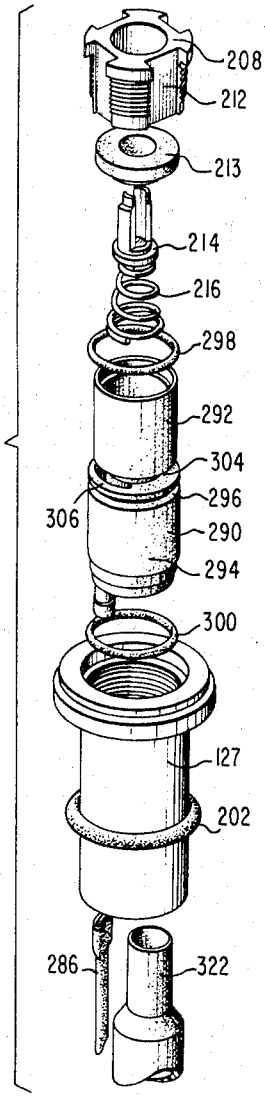
FIGURE 7 is an exploded view showing various elements of the modified embodiment of the keg adapter unit of FIGURES 5 and 6.
Figure 6:
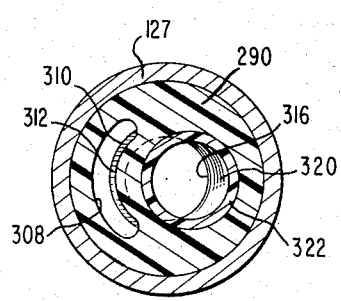
FIGURE 6 is a cross section through the keg adapter unit of FIGURE 5 taken along line 6—6 of FIGURE 5.

FIGURES 5, 6, and 7 illustrate a modified embodiment of the present invention wherein like parts bear like reference numerals. The coupler unit A of the modified embodiment is identical to that previously described and operates in the same manner. The modified adapter unit B of FIGURES 5–7, similarly incorporates a transition element so as to provide increased gas and liquid flow passages through the limited space available in a "Peerless" type beer keg, is substantially enclosed by a metal jacket, and similarly is insertable from the top through the "Peerless" opening. The embodiment of FIGURES 5–7 differs from that previously described primarily in that the transition element rather than being made of machined metal, is formed of suitable plastic such as a polycarbonate sold under the name "Lexan" and is preferably molded integral with an upper piece corresponding in some respects to the plastic center section 218 in the embodiment of FIGURES 2–4. By making the transition element of plastic, it may be simply and inexpensively molded to the appropriate design and the angular or slanted passageways through the coupler may be made longer and the transitions more smooth to further avoid wildness or foaming of the beer.

Referring to FIGURES 5–7, wherein like parts bear like reference numerals, the metal jacket or sleeve 127 is adapted to receive a plastic transition element 290. This element is preferably molded from "Lexan" and includes an upper valve section 292 and a lower transition section 294. The lower section is provided with an annular groove 296 to receive an "O-ring" sealing gasket 298 while the inner surface at the lower end of the sleeve 127 is similarly grooved to receive an additional "O-ring" seal 300. These "O-ring" seals frictionally retain the plastic transition tube 290 within the metal sleeve 127, so that the two are tightly engaged with each other and held in place within the beer keg by the sealing rings.

The upper end 292 of the transition element has a reduced outer diameter such as to be spaced slightly from the inner wall of the sleeve 127 to define the annular gas passageways 302 communicating with the gas passage grooves 212 of metal insert 208. Approximately midway of its length, the plastic transition element 290 is provided with a tapered annular groove 304 defining a ledge or shoulder 306 in which is molded an arcuate slot 308 best seen in FIGURE 6, providing a gas passageway through the transition element. Molded slot 308 is narrowed and arcuately curved about the central longitudinal axis of the adapter and includes a smaller section at its upper end at 310 and enlarger lower section 312. Lower section 312 of slot 308 extends downwardly through a lower end projection 314 formed integrally with transition element 290 and received over this projection is the Thomas-type rubber check valve 286. Transition element 290 provides for the flow of beer or liquid through its central or tubular chamber containing valve 214 and through a central circular cross section passageway 316 communicating with a lower eccentrically displaced or offset circular cross section passagegay 318 by means of an angular or slanted intermediate passage 320. Since transition element 290 is preferably molded from plastic, angular passageway 320 may be made as long or short as desired, and may be shaped as desired consistent with conventional molding practices so as to provide a smooth and, if desired, gradual transition between the lower offset passageway 318 and the axially concentric or central circular passageway 316. For normal operation, the transition passageway 320 may be fairly abrupt as illustrated because of the relatively large liquid flow path through the system, the normal limiting consideration being the gas flow passageway for series type beer keg systems.

Received by means of a press fit within offset passageway 318, is the reduced diameter portion 322 of a short rigid plastic tube 324, again preferably made of a polycarbonate such as "Lexan." This plastic tube is connected to siphon tube 228 for the flow of beer or other liquid by a sealing gasket and ferrule 278 in the manner previously described in conjunction with the embodiment of FIGURES 1–4.

An important feature of the embodiment of FIGURES 5–7 is the inexpensiveness of the construction and the wide permissible variations in transition sizes and shapes made possible by forming the transition element 290 of a moldable plastic. It will be noted that the air or gas passage 308 FIGURES 5–7 is substantially straight through with little or no turns or twists and includes a substantially enlarged portion 312 over a major portion of its length which is made possible by offsetting the lower liquid passage 318 receiving circular cross section tube 320. This makes possible a system particularly adapted for series beer keg connections wherein beer is forced through what are normally the air or gas passageways of one or more of the system kegs in a well known manner.

Once the units are assembled, the collar 119 is tightened down and the probe (not shown) of the coupler 44 engages in the notches formed in the upper ends of the valve arms 244 and 246 to depress the valve downwardly against spring 216 in both embodiments so that beer may flow outwardly past the valve to the dispenser 40. The probe has been omitted from the drawings for the sake of clarity and reference may be had to the aforementioned copending application for a more detailed description and explanation of the operation of the coupler and adapter system of the present invention.

It is apparent from the above that the present invention provides an improved tapping device for withdrawing beer or similar liquids from beer kegs and like containers and particularly an improved keg adapter unit or subassembly having enlarged liquid or gas passageways. An important feature of the present invention is the provision of an increased gas flow path through a system suitable for use in the restricted aperture available in the most common "Peerless" type draft beer systems. This is made possible, at least in part, by the provision of novel transition sections wherein the lower ends of the beer and gas passageways are offset and the gas passageway enlarged particularly at its lower end to make optimum use of the limited space available. At the same time, the units are substantially completely enclosed in a protective and corrosion resistant case of suitable metal such as stainless steel and further are insertable from the outside of the keg through the top aperture of a "Peerless" type beer keg. This completely avoids the necessity for attaching and/or assembling the keg adapter unit at least partly from within the beer keg. Other important features of the present invention reside in the fact that the central axial alignment of the beer valve is retained so that the units of the present invention may be cleaned by conventional equipment constructed for use with centralized beer passageways.

The improved keg adapter unit of this invention has a relatively large non-tortuous unobstructed liquid passageway through which the beer is withdrawn from the keg with a minimum of expansion and contraction, thereby substantially obviating the problem of beer becoming wild or flat during withdrawal and making the invention universally usable with low and high pressure beer systems. Moreover, the improved keg adapter units of this invention also include an enlarged gas passageway which is completely segregated from the liquid passage therein with the beer positively prevented from entering any part of a gas passageway from within the keg to prevent contamination of the beer. The keg adapter units include means for securing the units within the beer openings of conventional "Peerless" type beer kegs without modifications in the openings of the beer kegs and without any substantial modification of the adapter units themselves. The improved adapter units herein disclosed are universally usable with the coupler units particularly shown and described in copending application Serial No. 587,627 can be quickly and easily attached to these coupler units to permit tapping of the beer kegs without the economic loss of beer heretofore occasioned in tapping beer kegs using prior tapping devices. The arrangement of the device is such that all elements may be easily maintained and cleaned and can be manufactured competitively with, in some instances, certain parts of the unit molded from suitable rigid plastic such as "Lexan."

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid dispensing apparatus adapted for use with a keg or like container for liquids which has top, bottom, and side walls with an opening in one wall of said keg characterized in that it comprises: a keg adapter comprising an outer sleeve insertable into the opening in said one wall from outside said keg and adapted to be secured within the keg wall opening; a liquid passage through said sleeve for the transfer of liquid from the inside to the outside of a keg; normally closed liquid valve means in said liquid passage, with means for retaining said liquid valve means within said sleeve; a gas passage through said sleeve separate from said liquid passage; a transition element mounted in said sleeve, said transition element having liquid and gas apertures therethrough communicating with said liquid and gas passages, the upper end of said liquid aperture having its center aligned with the longitudinal axis of said sleeve, the lower end of said liquid aperture having its center offset from said axis; and a gas check valve in fluid communication with said gas aperture in said transition element.

2. Apparatus according to claim 1 wherein said sleeve is made of metal.

3. Apparatus according to claim 1 wherein said transition element is made of metal.

4. Apparatus according to claim 1 wherein said transition element is made of a rigid plastic.

5. Apparatus according to claim 4 wherein said plastic is polycarbonate.

6. Apparatus acording to claim 1 wherein said gas check valve comprises a rubber valve.

7. Apparatus according to claim 1 including a metallic insert secured within the upper end of said sleeve, said insert acting to clamp said liquid valve means within said sleeve.

8. Apparatus according to claim 7 wherein said metallic insert includes a plurality of threaded segments threaded into the end of said sleeve, the space between said segments defining a gas flow path through said sleeve around said insert.

9. Apparatus according to claim 1 wherein said liquid valve retaining means comprises an intermediate member mounted in said sleeve, and an insert secured in the upper end of said sleeve, a valve seat clamped between said intermediate member and said insert, a liquid valve within said intermediate member, and resilient means normally biasing said valve closed against said valve seat.

10. Apparatus according to claim 9 wherein said intermediate member is separate from said transition element.

11. Apparatus acording to claim 9 wherein said intermediate member is formed integral with said transition element.

12. A liquid dispensing apparatus adapted for use with a keg or like container for liquids which has top, bottom, and side walls with an opening in one wall of said keg characterized in that it comprises a keg adapter unit including: a metal outer sleeve insertable into the opening in said one wall from outside said keg and adapted to be secured within the keg wall opening; a liquid passage through said sleeve for the transfer of liquid from the inside to the outside of a keg; normally closed liquid valve means in said liquid passage, with means for retaining said liquid valve means within said sleeve; a gas passage through said sleeve separate from said liquid passage; a transition element mounted in said sleeve, said transition element having liquid and gas apertures therethrough communicating with said liquid and gas passages; said liquid aperture having a slanted portion whereby its lower end is offset from its upper end, the upper end of said liquid aperture being concentric with the longitudinal axis of said sleeve; and a gas check valve in fluid communication with said gas aperture in said transition element.

13. Apparatus according to claim 12 wherein said gas aperture also includes a slanted portion whereby its lower end is offset from its upper end.

14. Apparatus according to claim 12 wherein said gas aperture has at least a portion thereof extending straight through said transition element parallel to said axis.

15. Apparatus according to claim 12 wherein the upper and lower ends of said liquid aperture are both of circular cross section, said gas aperture having an elongated narrow cross section.

16. Apparatus according to claim 15 including a plastic tube received in the lower end of said liquid aperture and extending adjacent said check valve.

17. Apparatus according to claim 15 wherein said gas aperture is curved along the arc of a circle having said axis as its center.

References Cited

UNITED STATES PATENTS

| | | | |
|---|---|---|---|
| 3,065,885 | 11/1962 | Chatten | 222—400.7 |
| 3,173,586 | 3/1965 | Pawson | 222—400.7 |
| 3,228,413 | 1/1966 | Stevens | 222—400.7 X |
| 3,294,291 | 12/1966 | Sichler | 222—400.7 |

ROBERT B. REEVES, *Primary Examiner.*

N. S. STACK, *Assistant Examiner.*